US006488782B2

United States Patent
Kim et al.

(10) Patent No.: US 6,488,782 B2
(45) Date of Patent: Dec. 3, 2002

(54) METHOD OF REDUCING CORROSION POTENTIAL AND STRESS CORROSION CRACKING SUSCEPTIBILITY IN NICKEL-BASED ALLOYS

(75) Inventors: Young Jin Kim, Clifton Park, NY (US); Peter Louis Andresen, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/681,148

(22) Filed: Jan. 29, 2001

(65) Prior Publication Data

US 2002/0104407 A1 Aug. 8, 2002

(51) Int. Cl.⁷ .............................................. C23C 22/00
(52) U.S. Cl. ........................ 148/272; 148/247; 148/273; 148/284; 428/472.2; 376/306; 252/188.26
(58) Field of Search ................................ 148/240, 247, 148/272, 273, 284; 428/472.1, 472.2; 376/306; 252/188.26

(56) References Cited

U.S. PATENT DOCUMENTS

| 5,130,080 A | | 7/1992 | Niedrach |
| 5,135,709 A | | 8/1992 | Andresen et al. |
| 5,147,602 A | | 9/1992 | Andresen et al. |
| 5,465,281 A | | 11/1995 | Andresen et al. |
| 5,774,516 A | * | 6/1998 | Hettiarachchi et al. ..... 376/305 |
| 5,818,893 A | | 10/1998 | Hettiarachchi |
| 6,024,805 A | | 2/2000 | Kim et al. |
| 6,024,935 A | * | 2/2000 | Mills et al. .................. 423/648 |

OTHER PUBLICATIONS

ASM International Handbook Committee, "ASM Handbook, Formerly Tenth Edition, Metals Handbook: vol. 2 Properties and Selection: Nonferrous Alloys and Special-–Purpose Materials", ASM International, Jan. 1992, pp. 428–445.*

* cited by examiner

Primary Examiner—John Sheehan
Assistant Examiner—Andrew L. Oltmans
(74) Attorney, Agent, or Firm—Robert P. Santandrea; Noreen C. Johnson

(57) ABSTRACT

Method for reducing in situ the electrochemical corrosion potential and susceptibility to stress corrosion cracking of a nickel-base alloy and boiling water nuclear reactor components formed therefrom when in contact with high temperature water. The method comprises the steps of: adding a metal hydride to the high temperature water; dissociating the metal hydride in the high temperature water to form a metal and at least one hydrogen ion; and reducing the concentration of the oxidizing species by reacting the hydrogen ions with an oxidizing species, thereby reducing in situ the electrochemical corrosion potential of the nickel-base alloy. The method may further include the steps of reacting the metal with oxygen present in the high temperature water to form an insoluble oxide and incorporating the metal into the surface of the nickel-base alloy, thereby reducing the electrical conductivity of the surface of the nickel-base alloy. A nickel-base alloy component having a reduced electrochemical corrosion potential is also disclosed.

18 Claims, 2 Drawing Sheets

METHOD OF REDUCING CORROSION POTENTIAL AND STRESS CORROSION CRACKING SUSCEPTIBILITY IN NICKEL-BASED ALLOYS

BACKGROUND OF INVENTION

The present invention relates to protecting nickel-base alloys and components thereof from stress corrosion cracking when in contact with high temperature water. More particularly, the invention relates to protecting nickel-base alloy components of a boiling water reactor (BWR) from stress corrosion cracking when in contact with high temperature water. Even more particularly, the invention relates to protecting nickel-base alloy components of a boiling water reactor (BWR) from stress corrosion cracking when in contact with high temperature water by lowering the electrochemical corrosion potential of the nickel-base alloy components.

Nickel-base alloys, such as alloys 600, 690, 182, 82, X750, 718, and superalloys, have found applications in both boiling water nuclear reactors (hereinafter referred to as BWRs) and pressurized water nuclear reactors (hereinafter referred to as PWRs). These applications include use in many structural components found in nuclear reactors, such as, but not limited to, pipes, bolts, and weld material. Water for cooling the reactor core and extracting heat energy therefrom circulates within the BWR reactor pressure vessel, with about 15% of the water charged to steam. Inside the BWR reactor pressure vessel, the steam and circulating water typically have an operating pressure and temperature of about 7 MPa and 288° C., respectively. For a PWR, the circulating water has an operating pressure of about 15 MPa and a temperature of about 320° C. In the presence of water and/or steam under such high pressures and temperatures, components formed from nickel-base alloys are subject to intergranular stress corrosion cracking (hereinafter referred to as IGSCC), more commonly, or generically, referred to as stress corrosion cracking (hereinafter referred to as SCC).

Stress corrosion cracking (SCC) of nuclear reactor components has long been a concern. As used herein, SCC refers to cracking propagated by the application of static or dynamic tensile stresses in combination with corrosion at a crack tip. The stresses encountered within BWR and PWR pressure vessels include those arising from the operating pressure for containment of the high temperature water in a liquid state, vibration, differences in thermal expansion, residual stress from welding, and fabrication-related sources of stress. Various materials and environmental conditions, such as water chemistry, welding, surface nature, crevice geometry, heat treatment, radiation, and other factors can also increase the susceptibility of reactor components to SCC.

Boiling water reactors use water as a means of cooling nuclear reactor cores and extracting heat energy produced by such reactor cores. Stress corrosion cracking is of particular concern in BWRs, as radiolytic decomposition of the high temperature water in the BWR core increases the concentrations of oxidizing agents, such as $O_2$ and $H_2O_2$, in the high temperature water that circulates through the reactor. Consequently, the likelihood of extensive SCC in materials that are exposed to the high temperature reactor water is substantially increased. SCC can eventually lead to the failure of a nickel-base alloy structural component, such as a bolt. The premature failure of such components may lead to repeated or early shutdown of the reactor for part replacement or repair, thus reducing the amount of time the reactor is available for power generation.

The electrochemical corrosion potential (hereinafter referred to as ECP) affects the susceptibility of BWR components to SCC. The ECP is the mixed potential associated with the equilibrium of redox reactions occurring on a metal surface and the metal dissolution, and is dependent upon the amounts of oxidizing and reducing species present in the reactor water. In BWR reactor water, cathodic currents associated with the reduction of oxygen and hydrogen peroxide are balanced by anodic currents involving hydrogen oxidation and corrosion of metallic components.

Several approaches have been adopted to reduce SCC by lowering the ECP of the reactor water. In one such method, commonly referred to as hydrogen waterchemistry (HWC), gaseous hydrogen is added to the BWR feedwater. Hydrogen addition reduces the oxidant concentrations, and thus reduces SCC susceptibility, by recombining with dissolved oxidants that are produced by the radiolysis of water in the reactor core. One disadvantage of HWC is that large amounts of hydrogen are needed to sufficiently lower the concentration of dissolved oxygen and to achieve a low corrosion potential. In addition, HWC can also increase radiation levels in the reactor steam by increasing the volatility of radioactive N 16.

A second approach, known as noble metal technology (NMT), reduces the susceptibility of BWR components to stress corrosion cracking by lowering the corrosion potential more efficiently; i.e., by reducing the amount of hydrogen required to lower the electrochemical corrosion potential. The objective of NMT is to improve the catalytic properties for hydrogen/oxygen recombination on metal surfaces. Niederach (U.S. Pat. No. 5,130,080), Andresen and Niederach (U.S. Pat. Nos. 5,135,709 and 5,147,602), and Hettiarachchi (U.S. Pat. No. 5,818,893) have disclosed various NMT application methods, such as the thermal spraying of noble metal and noble metal alloy coatings on reactor components and noble metal chemical addition on metal reactor components. The NMT process lowers the corrosion potential to below $-500$ mV$_{SHE}$ (standard hydrogen electrode) with a small amount of hydrogen addition. When combined with hydrogen addition in stoichiometric proportions or greater, complete recombination of oxygen and hydrogen peroxide on the catalytic surface of the noble metal is achieved and the corrosion potential is dramatically reduced.

Other methods, which do not require the addition of hydrogen to reduce the corrosion potential of reactor components particularly of steel vessels and piping have been developed. Because electrically insulating films on metal surfaces reduce the corrosion potential, the ECP is also affected by the electrical conductivity of oxide films formed on metals in high temperature water. By lowering the electrochemical corrosion potential of metal components, the susceptibility of such materials to SCC can be significantly reduced. Andresen and Kim (U.S. Pat. No. 5,465,281) and Hettiarachchi (U.S. Pat. No. 5,774,516) teach a method of reducing the electrochemical corrosion potential of steel exposed to high temperature water with an insoluble and electrically non-conductive material, such as zirconia ($ZrO_2$), alumina ($Al_2O_3$), or yttria-stabilized zirconia (YSZ) powders. However, air plasma spray coatings generally must be applied to the components either prior to installation or during a power outage. Moreover, it is difficult to achieve complete coverage with injection of insoluble chemical compounds into the reactor water.

More recently, Andresen and Kim (U.S. Pat. No. 6,024,805) have disclosed an in situ method of reducing the ECP and thus lowering the susceptibility of stainless steel that is exposed to high temperature water to stress corrosion cracking. The method includes the addition of a metal hydride to the high temperature water.

The prior art has focused on reducing in situ the corrosion potential of stainless steel pressure vessels and piping within BWRs. While insulating oxide coatings have been applied to nickel-base alloys, to date no attempt has been made to reduce in situ the susceptibility of nickel-base alloys to stress corrosion cracking by lowering the electrochemical potential of the alloy in the BWR without adding hydrogen to the reactor water. Therefore, what is needed is a method of lowering the susceptibility of nickel-base alloys that are exposed to high temperature water to SCC. What is also needed is a method of lowering the ECP of nickel-base alloys exposed to high temperature water, thereby mitigating stress corrosion cracking in such alloys. Finally, what is also needed is a nickel-based alloy having a reduced corrosion potential, and thus, a reduced susceptibility to stress corrosion cracking.

SUMMARY OF INVENTION

The present invention meets these needs and others by providing a method of reducing in situ the ECP of a nickel-base alloy that is in contact with high temperature water, such as in, but not limited to, the pressure vessel of a BWR, without adding hydrogen to the water. The present invention also provides an article formed from a nickel-base alloy having a reduced corrosion potential.

Accordingly, one aspect of the present invention is to provide a method for reducing in situ an electrochemical corrosion potential of a nickel-base alloy having a surface that is in contact with high temperature water, the electrochemical corrosion potential being proportional to the concentration of oxidizing species present in the high temperature water. The method comprises the steps of: adding a metal hydride to the high temperature water, the metal hydride being capable of dissociating in water; dissociating the metal hydride in the high temperature water to provide a metal and hydrogen ions; and reducing the concentration of the oxidizing species by reacting the hydrogen ions with the oxidizing species, thereby reducing in situ the electrochemical corrosion potential of the nickel-base alloy.

A second aspect of the present invention is to provide a method of reducing the in situ susceptibility of a nickel-base alloy component that is in contact with high temperature water in a boiling water nuclear reactor to stress corrosion cracking. The method comprises the steps of: adding a metal hydride to the high temperature water, the metal hydride being capable of dissociating in water; dissociating the metal hydride in the high temperature water to provide a metal and hydrogen ions; and incorporating the metal into an oxide layer disposed on a surface of the nickel-base alloy, the oxide layer being in contact with the high temperature water, wherein the electrical conductivity of the surface of the nickel-base alloy is reduced, and wherein the resulting decrease in the electrical conductivity reduces in situ the susceptibility of stress corrosion cracking of the nickel-base alloy component.

A third aspect of the present invention is to provide a method of reducing in situ susceptibility of stress corrosion cracking of a nickel-base alloy component that is in contact with high temperature water in a boiling water nuclear reactor, the susceptibility of stress corrosion cracking being proportional to the concentration of oxidizing species present in the high temperature water. The method comprises the steps of: adding a metal hydride to the high temperature water, the metal hydride being capable of dissociating in water;. dissociating the metal hydride in the high temperature water to provide a metal and hydrogen ions; reducing the concentration of the oxidizing species, the oxidizing species being selected from the group consisting of $O_2$ and $H_2O_2$, by reacting the hydrogen ions with the oxidizing species, thereby reducing in situ the electrochemical corrosion potential of the nickel-base alloy; and incorporating the metal into an oxide layer disposed on a surface of the nickel-base alloy, the oxide layer being in contact with the high temperature water, wherein the electrical conductivity of the surface of the nickel-base alloy is reduced, and wherein the resulting decrease in the electrical conductivity reduces in situ the susceptibility of stress corrosion cracking of the nickel-base alloy component.

Finally, a fourth aspect of the present invention is to provide a nickel-base alloy component having a reduced susceptibility to stress corrosion cracking when said nickel-base alloy component is in contact with high temperature water. The nickel-base alloy component comprises: a nickel-base alloy; a surface and a layer disposed thereon, the layer being formed from an oxide of a first metal and being in contact with the high temperature water; and at least a second metal incorporated in the layer, wherein the second metal is incorporated in situ into the layer by adding a hydride of the second metal to the high temperature water, dissociating the hydride in the high temperature water, and incorporating the second metal into said oxide of said first metal.

These and other aspects, advantages, and salient features of the invention will become apparent from the following detailed description, the accompanying figures, and the appended claims.

DETAILED DESCRIPTION

Figure 1:
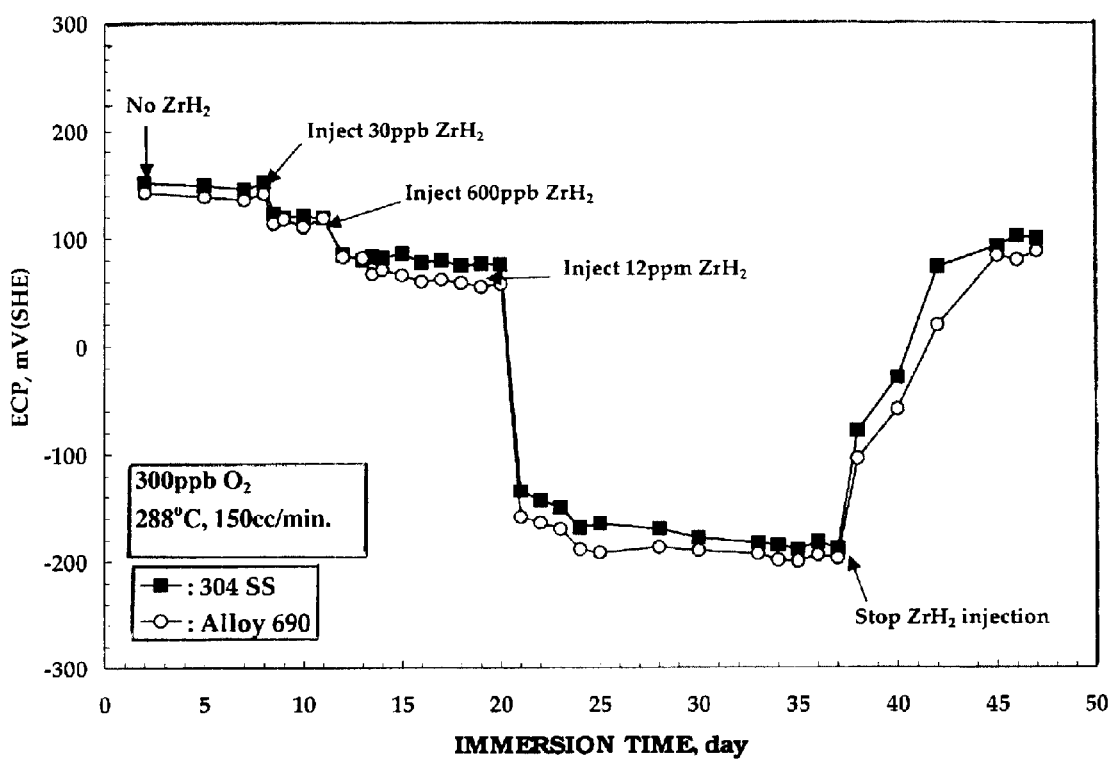
FIG. 1 is a plot of the electrochemical corrosion potential (ECP) of 304 stainless steel and nickel-base alloy 690 as a function of oxygen concentration in 288° C. water with the addition of zirconium hydride and without the addition of zirconium hydride.

In the following description, like reference characters designate like or corresponding parts throughout the several views shown in the figures. It is also understood that terms such as top, bottom, outward, inward, and the like are words of convenience and are not to be construed as limiting terms.

Referring to the figures and examples in general, it will be understood that the illustrations are for the purpose of describing a preferred embodiment of the invention and are not intended to limit the invention thereto.

The present invention discloses a new approach for achieving low corrosion potentials on nickel base alloys, such as alloys 600, 690, 182, 82, 718, X750, weld metals, nickel-base superalloys, and the like, that are widely used in BWRs. Unlike other methods found in the prior art for reducing the electrochemical corrosion potential (ECP) of materials used in BWRs, the method of the present invention does not require that hydrogen be separately added. In the present invention, a metal hydride $MH_n$ is injected into the reactor feedwater. The metal hydride can be directly injected as either a powder or slurry, or by suspending a metal hydride powder into the feedwater.

Once introduced into the reactor feedwater, the metal hydride $MH_n$ dissociates in high temperature water to yield the elemental metal and at least one hydrogen ion H+, as represented by the general reaction $$MH_n \rightarrow M + nH^+ + ne^- \qquad (1).$$

The high radiation flux within the BWR pressure vessel enhances the rate of dissociation of the metal hydride compound. In the present invention, the metal hydride that is used to lower the ECP of the nickel-base alloy is a hydride of a metal selected from the group consisting of hafnium, lanthanum, lithium, manganese, molybdenum, sodium, niobium, neodymium, palladium, praseodymium, plutonium, samarium, strontium, tantalum, thorium, titanium, uranium, vanadium, yttrium, and zirconium.

The concentrations of oxidizing species, such as $O_2$ or $H_2O_2$, in the high temperatu water are reduced as the oxidizing species react with the hydrogen ions released by the dissociation of the metal hydride $MH_n$, thus lowering the ECP of Ni-based alloy componen in the BWR. Oxygen, for example, reacts with the hydrogen ions released by the hydride decomposition, to yield water according to the reaction $$4e^- + 4H^+ + O_2 \rightarrow 2H_2O \qquad (2).$$

By reducing the concentrations of such oxidizing species, the corrosion potential and susceptibility of the nickel-base alloys that are exposed to the high temperature reactor water to stress corrosion cracking is correspondingly lowered.

In addition to reducing the ECP by providing hydrogen ions that react with oxidizing species present in the high temperature water, the present invention further reduces the ECP by incorporating the metal released by the decomposition of the metal hydride into the thin oxide layer that is present on the surface of the nickel-base alloy.

The neutral metal atom that is produced by the metal hydride dissociation of equation 1 may be readily ionized according to the reaction $$M \rightarrow M^{+n} + ne^- \qquad (3).$$

The metal ion $M^{n+}$ may then react with $O^{2-}$ ions in the high temperature water to for an oxide:

$$M^{+n} + O^{2-} \rightarrow MO(s) \qquad (4),$$

which is then deposited on the thin oxide layer that is present on the surface of the nickel-base alloy component. Alternatively, the metal ion $M^{n+}$ may be incorporated into the thin oxide layer by reacting with a substance typically, oxygen or an oxide located in the oxide layer. The incorporation of the metal into the oxide layer decreases the electronic conductivity of the oxide film and eventually decreases the ECP of the nickel-base alloy components, thus decreasing the susceptibility of these components to stress corrosion cracking. Incorporation of the metal into the thin oxide layer on the nickel-base alloy surface typically occurs when hydrides of the metals found in groups IIIB, IVB, and IVB of the periodic table are injected into the reactor feedwater. Preferably, zirconium hydride ($ZrH_2$), titanium hydride ($TiH_2$), scandium hydride, hafnium hydride, niobium hydride, and vanadium hydride ($VH_2$) are the metal hydrides used for the incorporation the metal into the thin oxide layer.

The present invention offers the advantage providing hydrogen ions to reduce the concentration of oxidizing species within the reactor water and reduce the corrosion potential of the nickel-base alloy reactor components while either reducing or eliminating the need to add gaseous hydrogen. Metal hydride injection results in a more even distribution of hydrogen than that obtained when hydrogen gas is added, thereby providing a greater overall reduction of oxidizing agents, such as $O_2$ or $H_2O_2$, in the water.

Moreover, the present invention further reduces the corrosion potential and susceptibility of nickel-base alloy reactor components to SCC by uniformly incorporating metals in situ into the oxide layer that is present on the surface of the nickel-base alloy. Air plasma spraying of noble metals and oxide coatings are generally unable to be applied in situ during plant operation.

The following example serves to illustrate the features and advantages of the present invention.

EXAMPLE 1

Electrochemical corrosion potential (ECP) measurements were performed on test electrodes of nickel-base alloy 690, 304 stainless steel, and zircaloy-2. The test electrodes were first pre-oxidized for 2 weeks in 288° C. water containing 200 ppb oxygen prior to the ECP measurement. The ECP of each test electrode was then measured for 2 days in 288° C. water containing 300 ppb oxygen. Suspensions of $ZrH_2$ were then injected into the recirculating water loop, and argon gas was purged through this injection solution during experiments. Oxygen and hydrogen concentrations in the outlet water were measured simultaneously with the ECP measurement.

Figure 2:
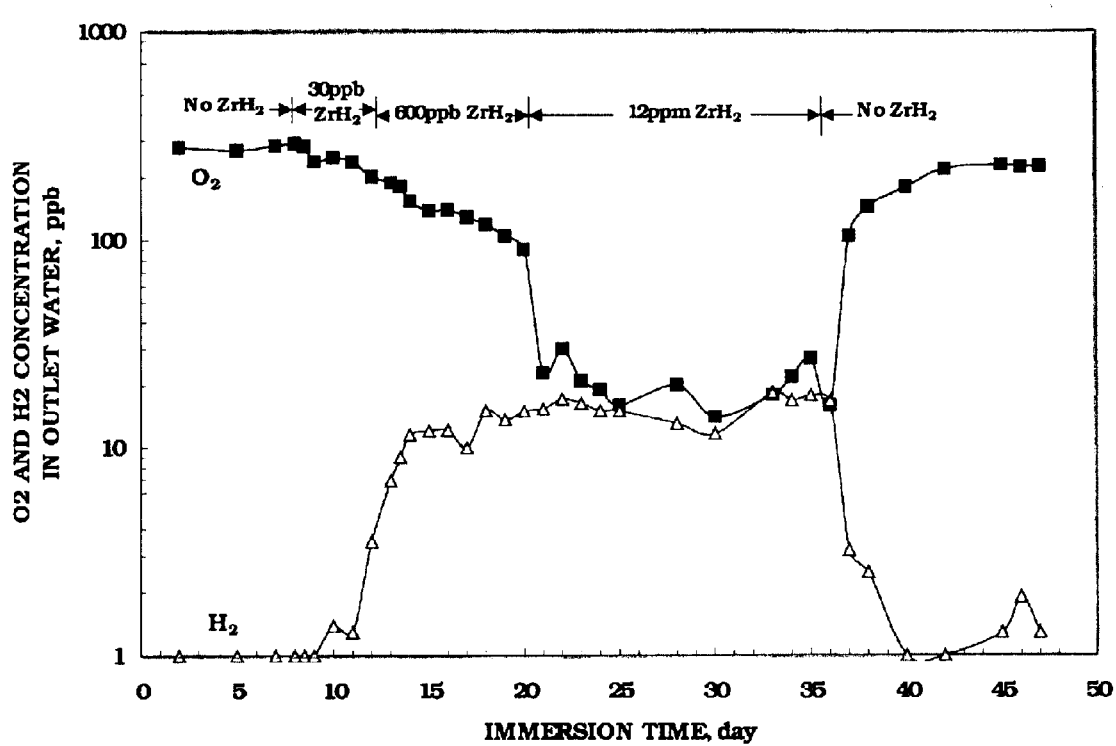
FIG. 2 is a plot of the effect of the addition of zirconium hydride ($ZrH_2$) on hydrogen and oxygen concentrations in 288° C. water.

FIG. 1 is plot of the electrochemical corrosion potential (ECP) of 304 stainless steel and nickel-base alloy 690 as a function of oxygen concentration in 288° C. water. As can be seen from FIG. 1, the addition of $ZrH_2$ decreased the ECP of the nickel-base alloy 690. No change in ECP, however, was observed on the zircaloy 2 specimen, which had already formed the insulating oxide ($ZrO_2$) on the surface. FIG. 2 shows the effect of $ZrH_2$ addition on the oxygen and hydrogen concentrations in the outlet water measured simultaneously with the ECP measurement. The ECP for 304 SS was measured as a reference.

As seen in FIG. 1, the ECP of nickel-base alloy 690 decreases to about −200 $mV_{SHE}$ with the addition of $ZrH_2$. The concentration of hydrogen produced by the decomposition of $ZrH_2$ in the high temperature water increases with increasing $ZrH_2$ injection time, as seen in FIG. 2. The results shown in FIGS. 1 and 2 show that $ZrH_2$ addition provides various beneficial effects on nickel-base alloys that are in contact with high temperature water. First, the hydrogen ions provided to the high temperature water by decomposing the metal hydride reduce the oxidant concentrations. Second, the metal from the metal hydride reacts in the high temperature water to form insoluble metal oxides which are then incorporated into the thin oxide layers that are present on the surface of nickel-base alloy components, thereby decreasing the electric conductivity of the component. These processes decrease the ECP of nickel-base alloys that are exposed to the high temperature water, thereby reducing the susceptibility of the alloys to SCC in high temperature water.

While various embodiments are described herein, it will be appreciated from the specification that various combinations of elements, variations or improvements therein may be made by those skilled in the art, and are within the scope of the invention. For example, the methods of the present invention are applicable to a wide range of water chemistry environments where a low corrosion potential leads to reduced SCC susceptibility.

What is claimed is:

1. A method for reducing in situ an electrochemical corrosion potential of a nickel-base alloy having a surface that is in contact with high temperature water, the electrochemical corrosion potential being proportional to the concentration of oxidizing species present in the high temperature water, the method comprising the steps of:

a) adding a metal hydride to the high temperature water, the metal hydride being capable of dissociating in water;

b) dissociating the metal hydride in the high temperature water to provide a metal and hydrogen ions; and c) reducing the concentration of the oxidizing species by reacting the hydrogen ions with the oxidizing species, thereby reducing in situ the electrochemical corrosion potential of the nickel-base alloy.

2. The method of claim 1, further including the step of incorporating the metal into the surface of the nickel-base alloy, thereby reducing the electrical conductivity of the surface of the nickel-base alloy.

3. The method of claim 2, wherein the metal hydride is a hydride of a metal selected from the group consisting of Group IIIB metals, Group IVB metals, and Group VB metals.

4. The method of claim 3, wherein the metal hydride is a metal hydride selected from the group consisting of zirconium hydride, titanium hydride, vanadium hydride, hafnium hydride, scandium hydride, niobium hydride, and combinations thereof.

5. The method of claim 2, wherein the surface of the nickel-base alloy includes an oxide film disposed thereon, and wherein the step of incorporating the metal into the surface of the nickel-base alloy comprises incorporating the metal into the oxide film.

6. The method of claim 1, wherein the metal hydride is a hydride selected from the group consisting of hafnium hydride, lanthanum hydride, lithium hydride, manganese hydride, molybdenum hydride, sodium hydride, niobium hydride, neodymium hydride, palladium hydride, praseodymium hydride, plutonium hydride, samarium hydride, strontium hydride, tantalum hydride, titanium hydride, thorium hydride, uranium hydride, vanadium hydride, yttrium hydride, and zirconium hydride.

7. The method of claim 1, wherein the step of adding a metal hydride to the high temperature water comprises injecting a metal hydride solid into the high temperature water.

8. The method of claim 1, wherein the nickel-base alloy is a nickel-base alloy selected from the group consisting of alloy 600, alloy 690, alloy 182, alloy 82, alloy 718, alloy X750, weld metals, and nickel-base superalloys.

9. The method of claim 1, wherein the oxidizing species is at least one species selected from the group consisting of oxygen and hydrogen peroxide.

10. A method of reducing the in situ susceptibility of a nickel-base alloy component that is in contact with high temperature water in a boiling water nuclear reactor to stress corrosion cracking, the method comprising the steps of:

a) adding a metal hydride to the high temperature water, the metal hydride being capable of dissociating in water;

b) dissociating the metal hydride in the high temperature water to provide a metal and hydrogen ions; and c) incorporating the metal into an oxide layer disposed on a surface of the nickel-base alloy, the oxide layer being in contact with the high temperature water, wherein the electrical conductivity of the surface of the nickel-base alloy is reduced, and wherein the resulting decrease in the electrical conductivity reduces in situ the susceptibility of stress corrosion cracking of the nickel-base alloy component.

11. The method of claim 10, wherein the metal hydride is a hydride of a metal selected from the group consisting of Group IIIB metals, Group IVB metals, and Group VB metals.

12. The method of claim 10, wherein the metal hydride is a hydride selected from the group consisting of zirconium hydride, titanium hydride, vanadium hydride, and mixtures thereof.

13. The method of claim 10, wherein the nickel-base alloy component comprises a nickel-base alloy selected from the group consisting alloy 600, alloy 690, alloy 182, alloy 82, alloy 718, alloy X750, weld metals, and nickel-base superalloys.

14. A method of reducing in situ susceptibility of stress corrosion cracking of a nickel-base alloy component that is in contact with high temperature water in a boiling water nuclear reactor, the susceptibility of stress corrosion cracking being proportional to the concentration of oxidizing species present in the high temperature water, the method comprising the steps of:

a) adding a metal hydride to the high temperature water, the metal hydride being capable of dissociating in water;

b) dissociating the metal hydride in the high temperature water to provide a metal and hydrogen ions;

c) reducing the concentration of the oxidizing species, the oxidizing species being selected from the group consisting of $O_2$ and $H_2O_2$, by reacting the hydrogen ions with the oxidizing species, thereby reducing in situ the electrochemical corrosion potential of the nickel-base alloy; and d) incorporating the metal into an oxide layer disposed on a surface of the nickel-base alloy, the oxide layer being in contact with the high temperature water, wherein the electrical conductivity of the surface of the nickel-base alloy is reduced, and wherein the resulting decrease in the electrical conductivity reduces in situ the susceptibility of stress corrosion cracking of the nickel-base alloy component.

15. The method of claim 14, wherein the metal hydride is a hydride of a metal selected from the group consisting of Group IIIB metals, Group IVB metals, and Group VB metals.

16. The method of claim 15, wherein the metal hydride is a hydride selected from the group consisting of zirconium hydride, titanium hydride, vanadium hydride, and mixtures thereof.

17. The method of claim 14, wherein the nickel-base alloy component comprises a nickel-base alloy selected from the group consisting alloy 600, alloy 690, alloy 182, alloy 82, alloy 718, alloy X750, weld metals, and nickel-base superalloys.

18. The method of claim 1, wherein the step of adding a metal hydride to the high temperature water comprises injecting a metal hydride solid into the high temperature water.

* * * * *